United States Patent
Zurecki et al.

(10) Patent No.: US 7,252,024 B2
(45) Date of Patent: Aug. 7, 2007

(54) APPARATUS AND METHOD FOR MACHINING WITH CRYOGENICALLY COOLED OXIDE-CONTAINING CERAMIC CUTTING TOOLS

(75) Inventors: Zbigniew Zurecki, Macungie, PA (US); Robert Bruce Swan, Lehighton, PA (US); Bruce Edward Snyder, Pottstown, PA (US); John Herbert Frey, Allentown, PA (US); Philip Burton Jewell, Jr., Binghamton, NY (US); Ranajit Ghosh, Allentown, PA (US); James Bryan Taylor, Victor, NY (US)

(73) Assignee: Air Products & Chemicals, Inc., Allentown, PA (US)

( * ) Notice: Subject to any disclaimer, the term of this patent is extended or adjusted under 35 U.S.C. 154(b) by 0 days.

(21) Appl. No.: 10/478,939

(22) PCT Filed: May 23, 2002

(86) PCT No.: PCT/US02/16216

§ 371 (c)(1),
(2), (4) Date: Mar. 9, 2004

(87) PCT Pub. No.: WO02/096598

PCT Pub. Date: Dec. 5, 2002

(65) Prior Publication Data

US 2004/0154443 A1    Aug. 12, 2004

(51) Int. Cl.
*B23B 3/00* (2006.01)
*B23B 37/00* (2006.01)

(52) U.S. Cl. .............................. 82/1.1; 82/50; 82/901
(58) Field of Classification Search ............... 407/110; 82/50, 901
See application file for complete search history.

(56) References Cited

U.S. PATENT DOCUMENTS

| | | | |
|---|---|---|---|
| 3,971,114 A | 7/1976 | Dudley | |
| 4,547,470 A | 10/1985 | Tanase et al. | |
| 4,829,859 A | 5/1989 | Yankoff | |
| 5,103,701 A | 4/1992 | Lundin et al. | |
| 5,237,894 A * | 8/1993 | Lindeke | 82/1.11 |
| 5,432,132 A | 7/1995 | Dasgupta et al. | |

(Continued)

FOREIGN PATENT DOCUMENTS

CN        1075446 A    8/1993

(Continued)

OTHER PUBLICATIONS

U.S. Appl. No. 09/870,853, filed May 31, 2001, Zurecki et al.

(Continued)

*Primary Examiner*—Willmon Fridie, Jr.
(74) *Attorney, Agent, or Firm*—Caesar, Rivise, Bernstein, Cohen & Pokotilow, Ltd.

(57) ABSTRACT

A method and an apparatus or machining a workpiece include the use of a cryogenically cooled oxide containing ceramic cutting tool. The method involves cryogenic cooling of the cutting tool during a cutting operation, which cooling results in enhanced wear resistance and fracture resistance of the cutting tool. A preferred embodiment involves jetting a cryogenic fluid directly at the cutting tool.

18 Claims, 2 Drawing Sheets

U.S. PATENT DOCUMENTS

| | | | |
|---|---|---|---|
| 5,442,981 A * | 8/1995 | Vegh | 82/1.11 |
| 5,449,647 A | 9/1995 | Brandt | |
| 5,509,335 A | 4/1996 | Emerson | |
| 5,592,863 A | 1/1997 | Jaskowiak et al. | |
| 5,597,272 A | 1/1997 | Moriguchi | |
| 5,761,974 A | 6/1998 | Wang et al. | |
| 5,878,496 A | 3/1999 | Liu et al. | |
| 5,901,623 A * | 5/1999 | Hong | 82/50 |
| 6,010,283 A | 1/2000 | Henrich et al. | |
| 6,017,172 A | 1/2000 | Ukegawa et al. | |
| 6,053,669 A * | 4/2000 | Lagerberg | 407/11 |
| 6,712,564 B1 * | 3/2004 | Hughes et al. | 407/119 |

FOREIGN PATENT DOCUMENTS

| | | |
|---|---|---|
| DE | 19600172 A1 | 8/1997 |
| EP | 0945222 A2 | 9/1999 |
| JP | 328397 | 11/1953 |
| JP | 6031502 A1 | 2/1994 |
| JP | 11156669 A1 | 6/1999 |
| JP | 11320328 A1 | 11/1999 |
| WO | WO 99/60079 A2 | 11/1999 |

OTHER PUBLICATIONS

Chou et al., "Microstructural Effects in Precision Hard Turning," MED-vol. 4, *Manufacturing Science and Engineering, ASME* 1996, pp. 237-242.

*Ceramics and Glasses, Engineered Materials Handbook*, vol. 4, ASM International, The Materials Information Society, 1991.

D'Errico et al. "Performance of Ceramic Cutting Tools in Turning Operations," *Industrial Ceramics*, vol. 17, 1997, pp. 80-83.

Dewes et. al. "The Use of High Speed Machining for the Manufacture of Hardened Steel Dies" NAMRI/SME vol. 24, 1996, pp. 21-26.

Edwards, *Cutting Tools* 1993, The Institute of Materials, London, p. 20.

Kitagawa et. al., "Temperature and wear of cutting tools in high speed machining of Inconel 718 and Ti—6A1-6V-2Sn" *Wear* 202 (1997), pp. 142-148, Elsevier Science.

"Machining," *Metals Handbook* 9th Edition, vol. 16, 1996.

Mehrotra, "Chapter 1: Applications of Ceramic Cutting Tools," *Key Engineering Materials*, 1998, vols. 138-140, Trans Tech Publications, Switzerland, pp. 1-24.

"Tool Materials," *ASM Specialty Handbook*, 1995, p. 73.

Trent et al., *Metal Cutting*, 4th Edition, Butterworth Heinemann, Boston, Oxford 2000.

* cited by examiner

APPARATUS AND METHOD FOR MACHINING WITH CRYOGENICALLY COOLED OXIDE-CONTAINING CERAMIC CUTTING TOOLS

BACKGROUND OF THE INVENTION

The present invention relates to the field of machining of materials by cutting (e.g., shaping parts by removing excess material in the form of chips), and more particularly machining of materials by cutting with cryogenically cooled oxide-containing ceramic cutting tools.

As used herein, the term "cutting" includes but is not limited to the following operations: turning, boring, parting, grooving, facing, planing, milling, drilling and other operations which generate continuous chips or fragmented or segmented chips. The term cutting does not include: grinding, electro-discharge machining, ultrasonic cutting, or high-pressure jet erosion cutting, i.e., operations generating very fine chips that are not well defined in shape, e.g., dust or powder.

The term "oxide-containing ceramic cutting tool," as used herein, includes cutting tools (or cutting tips or cutting bits) made of oxide-containing ceramic materials and/or any other advanced tool materials containing at least 5% by weight of an oxide ceramic phase.

The "material removal rate," a measure of machining productivity, is the volume of material removed by a tool per unit time and is defined by the machining parameters selected for the operation. In the case of turning, the most generic cutting operation, the material removal rate is the product of cutting speed, tool feed-rate, and depth of cut. The objective is to enable machining at a higher cutting speed, a higher feed-rate, a greater depth of cut, or at any combination of these parameters leading to an overall increase in material removal rate. Alternatively, the objective is to enhance the life of cutting tools in order to minimize the down-time spent for tool change-over and/or to reduce worn tooling costs. In certain machining operations, it is sometimes desired to increase cutting speed only while keeping material removal rate constant, or even reducing it, in order to produce an improved surface finish of a machined part or to reduce cutting force and/or part fixturing requirements. This can be accomplished by a corresponding reduction in feed-rate or depth of cut, or both. The undesired effect of such a manipulation with machining parameters is a significant increase in tool temperature leading to its premature wear and failure. The objective is to minimize this undesired effect.

Driven by economic factors, the machining industry is interested in achieving cost-reductions by:
- increasing material removal rates without increases in worn tool and tool change-over costs, thereby increasing productivity;
- increasing cutting speeds without increases in worn tool and tool change-over costs;
- turning or milling hard parts which, in the past, could have been produced only via expensive grinding operations; and
- using cleaner, safer, and more health-acceptable machining methods to eliminate numerous costs associated with conventional cutting fluids (e.g., emulsions) and clean-up operations.

New, advanced cutting tool materials recently have been developed and commercialized to address these needs and improve the cutting performance of conventional tools made of high-speed steel (HSS) or tungsten carbide-cobalt (WC/Co). Compared to tools made of HSS and WC/Co, these new tools are significantly harder but also are much more brittle and sensitive to load stress and/or thermal stress shocking. Some of these advanced cutting materials, such as oxide ceramics and cermets, are capable of operating at relatively high temperatures. (Cermets are dense composite materials comprising both ceramic and metallic phases. As applied in the field of machining technologies, the term cermet includes carbide, nitride, boride, oxide and/or other more complex ceramic particles bonded or infiltrated with alloyed metals, but excludes the conventional WC/Co "hard metals.") However, the wear behavior of oxide ceramics is less predictable than that of HSS, WC/Co or other advanced tool materials. After an initial, usually negligible, cratering, flank wear, and/or notching, the oxide ceramic tools usually fracture catastrophically within the cutting edge area or nose, resulting in machining down-time and, frequently, in a damaged work-piece surface.

Table 1 below compiles typical values of thermo-mechanical properties of some of the most popular cutting tool materials. Compared to carbide, nitride, and diamond-based cutting tools, the oxide ceramic-based tools show significantly lower values of a combined traverse rupture strength, fracture toughness, and thermal conductivity, while revealing a dangerously high thermal expansion coefficient. This makes the oxide ceramic tools prone to brittle fracture under mechanical load as well as cracking due to a localized thermal expansion in thermal gradient.

TABLE 1

Thermo-mechanical Properties of Popular Cutting Tool Materials

| Tool material | Traverse rupture strength (M Pa) | Fracture toughness ($K_{1C}$) M Pa m$^{-1/2}$ | Thermal expansion coefficient (ppm/° C.) | Thermal conductivity at 20° C. (W/m° C.) |
|---|---|---|---|---|
| $Al_2O_3$ | 550 | 4 | 8 | 9 |
| $Al_2O_3$—TiC | 800 | 4.5 | 8 | 16–21 |
| $Al_2O_3$—1% $ZrO_2$ | 700 | 5.5 | 8.5 | 10 |
| SiAlON | 800 | 6.5 | 3 | 2–20 |
| $Si_3N_4$ | 100–800 | 1.5–5.5 | 3.5 | 7–54 |
| SiC | 550–860 | 4.6 | 4.5 | 57–77 |
| Polycryst. CBN (PCBN) | 800–1100 | 4.5 | 5 | 100 |
| Polycryst. Diamond (PCD) | 390–1550 | 6–8 | 4 | 560 |
| WC/Co (TiC—TaC addit.) | 2000–3400 | 9 | 4–6 | 80–121 |

Data compiled from: "*Ceramics and Glasses, Engineered Materials Handbook*", Vol.4, ASM Int., The Materials Information Soc., 1991, "*Microstructural Effects in Precision Hard Turning*", Y. K. Chou and C. J, Evans, MED-Vol. 4, Mfg. Sci. and Engr., ASME 1996., and "*Temperature and Wear of Cutting Tools in High-speed Machining of Inconel 718 and Ti-6Al-6V-2Sn*", T. Kitagawa et al., Wear 202 (1997), Elsevier, pp. 142–148.

It is recognized that all conventional coolants and cutting fluids, including room-temperature water and an emulsified oil, as well as evaporative-cooling fogs or oil mists, can thermally shock and fracture oxide ceramics. The machining community is well aware of the need to avoid the use of these cutting fluids and coolants when machining with oxide ceramic cutting tools. Numerous publications, research papers, and tool manufacturers' recommendations warn machining operators about a drastic reduction of ceramic tool life on contact with conventional cutting fluids or even with a small residue of such fluids on workpiece surfaces. Despite numerous inherent deficiencies, e.g., overheated workpiece, reduced dimensional accuracy, and risk of chip fires, dry machining is recommended when ceramic cutting tools are used.

P. K. Mehrotra of Kennametal teaches in the "*Applications of Ceramic Cutting Tools*", Key Engineering Materials, Vol. 138–140 (1998), Chapter 1, pp. 1–24 that: "the use of coolants is not recommended when these [ceramic] tools are used to machine steels due to their low thermal shock resistance". R. Edwards states: "this ceramic [Al2O3-ZrO2 white ceramic] has a low thermal conductivity which makes it susceptible to thermal shock and so the use of coolant should be avoided", "*Cutting Tools*", The Institute of Materials, 1993, p. 20. According to D'errico, et al, "when a coolant is used, alumina, alumina/zirconia, and alumina/TiC tools, with one exception, tend to have poor performance probably due to limited thermal shock capability resulting from high thermal expansion coefficients", "*Performance of Ceramic Cutting Tools in Turning Operations*", Industrial Ceramics, Vol 17, #2, 1997. A 1995 ASM handbook adds: "water or oil coolants are not recommended for use with cold-pressed Al2O3-base ceramics because they may cause the insert to crack. If carbide tooling is used to machine a part run with coolant and a subsequent operation is planned using a cold-pressed oxide-base ceramic, the residual coolant should be blown away from the part", ASM Specialty Handbook, "Tool Materials", 1995, p. 73. R. C. Dewes and D. K. Aspinwall ("*The Use of High Speed Machining for the Manufacture of Hardened Steel Dies*", Trans. of NAMRI/SME, Vol. XXIV, 1996, pp.21–26) tested a range of oxide and nitride tools including: 71% $Al_2O_3$-TiC (mixed alumina), 75% $Al_2O_3$-SiC (whisker reinforced alumina), 50% CBN-$AlB_2$-AlN, 50%-TiC-WC-AlN-$AlB_2$, 80% CBN-TiC-WC, as well as 95% CBN-Ni/Co. They found that the use of conventional cooling fluid applied by flooding or spraying resulted in the reduction of tool life by more than 95% except for the whisker reinforced alumina for which the life was shortened by about 88%.

The oxide ceramics have one thing in common with all of the other cutting tool materials—as their temperature increases, they soften, weaken, and build-up localized, internal stresses (due to thermal expansion frequently compounded with a limited conductivity) which ultimately leads to a limit in the cutting speed, material removal rate, and/or the hardness of workpieces machined. This common characteristic of tool materials is well described by E. M. Trent and P. K. Wright in "*Metal Cutting*", 4th Ed., Butterworth, Boston, Oxford, 2000, and in the ASM Handbook on "*Machining, Ceramic Materials*".

Thus, a problem facing the machining industry is the inability to use conventional cooling methods with oxide ceramic cutting tools, i.e., the thermo-mechanical limitation on further increases in cutting speed, material removal rate, and/or the hardness of workpieces being machined.

Other problems facing the machining industry include significant environmental and health related problems associated with the conventional cutting fluids and coolants presently used in the industry. For example, carbon dioxide ($CO_2$), a commonly used coolant, is a greenhouse generator. Also, since $CO_2$ is denser than air it presents a potential asphyxiation concern. In addition, $CO_2$ also has the potential to cause acid corrosion, since it is soluble in water. Freons and freon substitutes, some other commonly used coolants, also are greenhouse generators and ozone depleters. These substances also are explosive and/or toxic when heated on contact with red-hot solids. Other coolants which can be explosive include hydrocarbon gases and liquefied ammonia. Coolants such as cryogenic/liquefied air with oxygen in it can result in chip fires.

There exists a relatively large body of prior art patents pertaining to cryogenic cooling of cutting tools, including: U.S. Pat. No. 5,761,974 (Wang, et al.), U.S. Pat. No. 5,901,623 (Hong), U.S. Pat. No. 3,971,114 (Dudley), U.S. Pat. No. 5,103,701 (Lundin, et al.), U.S. Pat. No. 5,509,335 (Emerson), U.S. Pat. No. 4,829,859 (Yankoff), U.S. Pat. No. 5,592,863 (Joskowiak, et al.) and WO 99/60079 (Hong). However, neither these patents nor the other prior art references discussed herein solve the problems discussed above or satisfy the needs set forth below.

It is desired to have an apparatus and a method that enables machining operators to increase machining speeds and/or material removal rates without shortening the useful life of tools made of oxide-containing ceramic materials and/or any other advanced tool materials containing a significant fraction of oxide ceramic phase.

It is further desired to have an improved apparatus and a method for cooling and strengthening cutting tools made of materials revealing a tendency to wear and fail by brittle cracking so as to enable cutting at increased speed without reducing the useful life of cutting tools.

It is still further desired to have an apparatus and a method that increase material cutting speeds and/or productivity, which are limited by the lifetime (and cost) of cutting tools.

It is still further desired to have an apparatus and a method for machining materials and/or parts that cannot tolerate elevated temperatures generated on contact with the hot edge(s) of cutting tools.

It is still further desired to have an apparatus and a method for machining a workpiece which improves safety and environmental conditions at work places by minimizing the risks of chip fires, burns and/or chip vapor emissions while using an environmentally acceptable, safe, non-toxic and clean method of cooling cutting tools.

It also is desired to have an apparatus and a method for machining a workpiece which overcome the difficulties and disadvantages of the prior art to provide better and more advantageous results.

BRIEF SUMMARY OF THE INVENTION

Applicants discovered that if oxide-containing ceramic cutting tools, both brittle and thermal shock-sensitive, are cooled during machining with a cryogenic fluid, the life of the cutting tools increases and cutting at higher speeds and/or with higher material removal rates becomes feasible and cost-effective. This result was surprising and unexpected to Applicants and would be surprising and unexpected to others skilled in the art. Nothing in the prior art has indicated such a desired outcome for oxide-containing ceramic cutting tools. In fact, as indicated above, the prior art has taught away from Applicants' invention.

Applicants' invention is an apparatus and a method for machining a workpiece. Another aspect of the invention is a workpiece machined by the apparatus and the method. An additional aspect of the invention is an oxide-containing ceramic cutting tool adapted to be cryogenically cooled in the apparatus for machining a workpiece adjacent the oxide-containing ceramic cutting tool.

A first embodiment of the apparatus for machining a workpiece includes: an oxide-containing ceramic cutting tool adjacent the workpiece; and a means for cryogenically cooling the oxide-containing ceramic cutting tool.

There are many variations of the first embodiment of the apparatus. In one variation, the oxide-containing cutting tool contains at least about 5% by weight of an oxide ceramic phase. In another variation, at least a portion of the cutting tool is frosted when the workpiece contacts the cutting tool.

In a preferred embodiment of the apparatus, the means for cryogenically cooling the oxide-containing ceramic cutting tool includes a cryogenic fluid. Preferably, the cryogenic fluid is selected from a group consisting of liquid nitrogen, gaseous nitrogen, liquid argon, gaseous argon and mixtures thereof.

There are several variations of the preferred embodiment of the apparatus. In one variation, at least a portion of the cryogenic fluid is a two-phase fluid. In another variation, the cutting tool has a cutting edge and the means for cryogenically cooling the cutting tool includes a means for delivering a portion of the cryogenic fluid to the cutting tool, said means for delivering having at least one discharge point spaced apart from the cutting edge by a distance greater than or equal to about 0.150 inches and less than about 3.0 inches.

In a most preferred embodiment of the apparatus, at least a portion of the cryogenic fluid is delivered to the oxide-containing ceramic cutting tool in the form of a cryogenic jet. In one variation of this embodiment, the cutting tool has a rake surface and at least a portion of the cryogenic jet impinges on at least a portion of the rake surface. In another variation, at least a portion of the cryogenic jet has a temperature below about minus 150 degrees Celsius (−150° C.).

Another embodiment of the apparatus for machining a workpiece includes: an oxide-based ceramic cutting tool adjacent the workpiece; a supply of a cryogenic fluid; and a means for delivering a portion of the supply of the cryogenic fluid to the oxide-based ceramic cutting tool in the form of a cryogenic jet discharged from a location spaced apart from the cutting tool.

Another aspect of the invention is a workpiece machined by an apparatus as in any of the aforesaid embodiments and characterized by an improved surface.

A first embodiment of the method for machining a workpiece includes multiple steps. The first step is to provide an oxide-containing ceramic cutting tool adjacent the workpiece. The second step is to cryogenically cool the oxide-containing ceramic cutting tool.

There are several variations of the first embodiment of the method. In one variation, at least a portion of the cutting tool is frosted when the workpiece contacts the cutting tool. In another variation, the oxide-containing cutting tool contains at least about 5% by weight of an oxide ceramic phase.

In a preferred embodiment of the method, the oxide-containing ceramic cutting tool is cryogenically cooled by a cryogenic fluid. Preferably, the cryogenic fluid is selected from a group consisting of liquid nitrogen, gaseous nitrogen, liquid argon, gaseous argon and mixtures thereof.

There are several variations of the preferred embodiment of the method. In one variation, at least a portion of the cryogenic fluid delivered to the cutting tool is a two-phase fluid. In another variation, the cutting tool has a cutting edge, and a means for delivering a portion of the cryogenic fluid to the cutting tool has at least one discharge point spaced apart from the cutting edge by a distance greater than or equal to about 0.150 inches and less than about 3.0 inches.

In a most preferred embodiment of the method, at least a portion of the cryogenic fluid is delivered to the oxide-containing ceramic cutting tool in the form of a cryogenic jet. In one variation of this embodiment, at least a portion of the cryogenic jet has a temperature below about minus 150 degrees Celsius (−150° C.).

Another embodiment of the method for machining a workpiece includes multiple steps. The first step is to provide an oxide-based ceramic cutting tool adjacent the workpiece. The second step is to provide a supply of a cryogenic fluid. The third step is to deliver a portion of the supply of the cryogenic fluid to the oxide-based ceramic cutting tool in the form of a cryogenic jet discharged from a location spaced apart from the cutting tool.

Another aspect of the invention is a workpiece machined by a method as in any of the aforesaid embodiments and characterized by an improved surface.

BRIEF DESCRIPTION OF THE DRAWINGS

The invention will be described by way of example with reference to the accompanying drawings, in which.

DETAILED DESCRIPTION OF THE INVENTION

Figure 1:
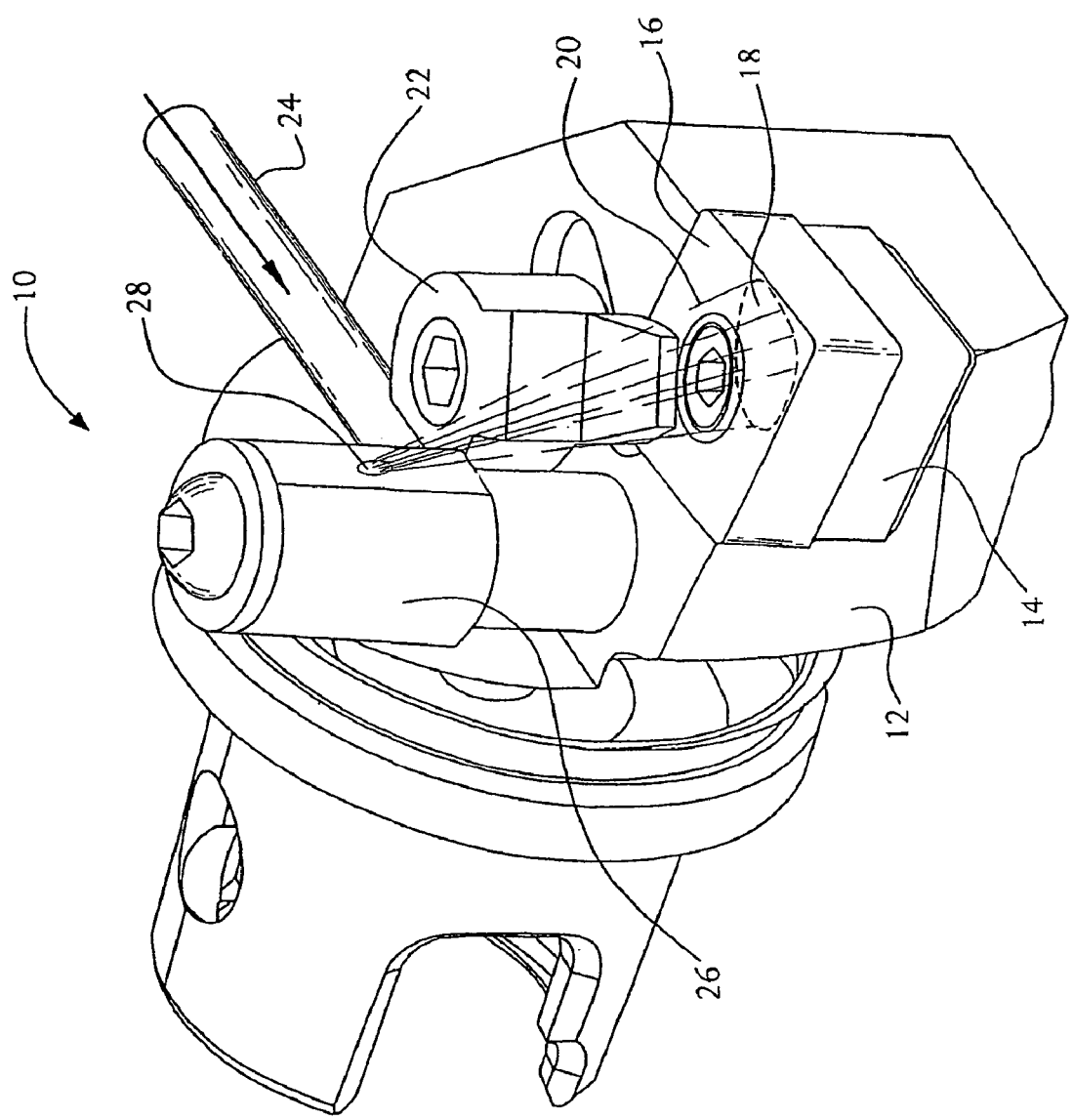
FIG. 1 is a schematic illustration of one embodiment of the invention.

The present invention is an apparatus and a method which use cryogenic cooling and/or freezing of the rake surface and the rest of a cutting tool made of oxide-containing ceramic materials, known for their tendency to fail during machining operations by brittle fracture. In a preferred embodiment, a cryogenic fluid is applied directly to the surface of an oxide-containing ceramic cutting tool, but other ways of cryogenic cooling of the oxide-containing ceramic cutting tool are within the scope of this invention. In a most preferred embodiment, a jet of cryogenic fluid having a temperature of about minus 150 degrees Celsius (−150° C.) or less is discharged directly at the rake surface of the cutting tool. Additionally, Applicants have developed the following guidelines to match the amount of cryogenic cooling with actual machining conditions for cutting operations carried out in a normal, ambient air environment:

(1) cryogenic fluid cooling operations should be carried out with some white frost coating on the cutting tool or cutting insert surface to obtain the full benefits of the present invention;

(2) if a frost line forms near the cutting edge which moves back toward the other end of the cutting tool during cutting operations, the cooling effect is diminished, indicating the need for an increase in flowrate and/or pressure of the cryogenic fluid;

(3) if the chip or work surface just below the cutting edge is bright red, or appears to melt, or burn, the flowrate and/or pressure of the cryogenic fluid must be increased;

(4) if the tool nose or the perimeter of the chip contact area on the rake surface is cherry-red, there is no need to increase the flowrate and/or pressure of the cryogenic fluid unless the frosted coating on the tool starts to shrink;

(5) if the tool nose or the perimeter of the chip contact area on the rake surface is intensely bright red, the flowrate and/or pressure of the cryogenic fluid must be increased regardless of the condition of the frosted coating on the tool surface; and (6) an exception to guidelines (1)–(5) would apply if machining is carried out under very low humidity conditions in a controlled atmosphere chamber or in a vacuum where the benefits of the invention could be achieved without producing a white frost coating.

The apparatus and the method for cooling cutting tools will improve environmental conditions and safety at workplaces by using clean coolants and reducing the risk of chip fires, operators' burns and/or toxic chip vapor emissions, and will reduce environmental problems by using coolants with no greenhouse and ozone-depletion potential.

In addition to direct jetting of a cryogenic fluid, other methods of applying cryogenic fluid to oxide-containing ceramic tools are within the scope of this invention, as are other methods of cryogenically cooling such cutting tools without the use of cryogenic fluids. These methods include but are not limited to: (1) closed-cycle cryogenic mini-refrigerators deriving their cooling power from the Joule-Thompson expansion of a high-pressure gas, (2) magneto-caloric effect refrigerators suggested first by W. F. Giauque and P. Debye in 1926, (3) cascaded thermoelectric cells, and (4) laser beam refrigeration of certain solids. Since these and similar methods necessitate an indirect cooling of cutting tools via a thermally conductive toolholder or additional chill-plates, such methods are more complex and expensive than the preferred methods of the present invention, especially in the case of heavier cutting operations and/or larger cutting tools.

FIG. 1 illustrates a preferred embodiment of the invention in which a jet of cryogenic fluid is directed at the surface of an oxide-containing ceramic cutting tool. The apparatus 10 includes a conventional toolholder 12 used in turning operations and a conventional carbide shim 14 supporting a cutting insert 16. The impingement spot 18 of direct impingement of the cryogenic fluid 20 on the surface of the cutting insert is illustrated schematically in FIG. 1. The impinged fluid spreads out of the impingement spot in radial directions. The cutting insert 16 is made of an oxide-containing ceramic material. Other components of the apparatus include an insert holding clamp 22 used in certain types of tooling (a non-essential component) and a thin tubing 24 for delivering the cryogenic fluid to a cryogenic fluid nozzle assembly 26 for directing the jet toward the cutting insert through an orifice 28 in the nozzle assembly. The nozzle assembly shown in FIG. 1 is an adjustable geometry, add-on component of the tooling. Other fixed geometry nozzles also can be used to practice the invention.

Figure 2A:
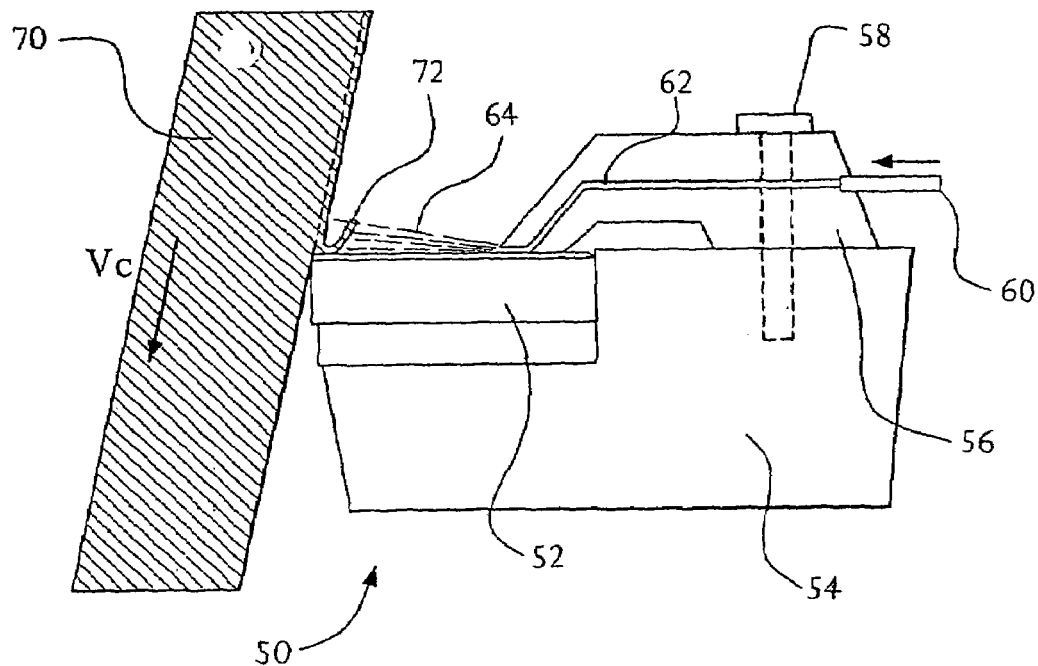
FIGS. 2A and 2B are schematic illustrations of alternate embodiments of the invention.
Figure 2B:
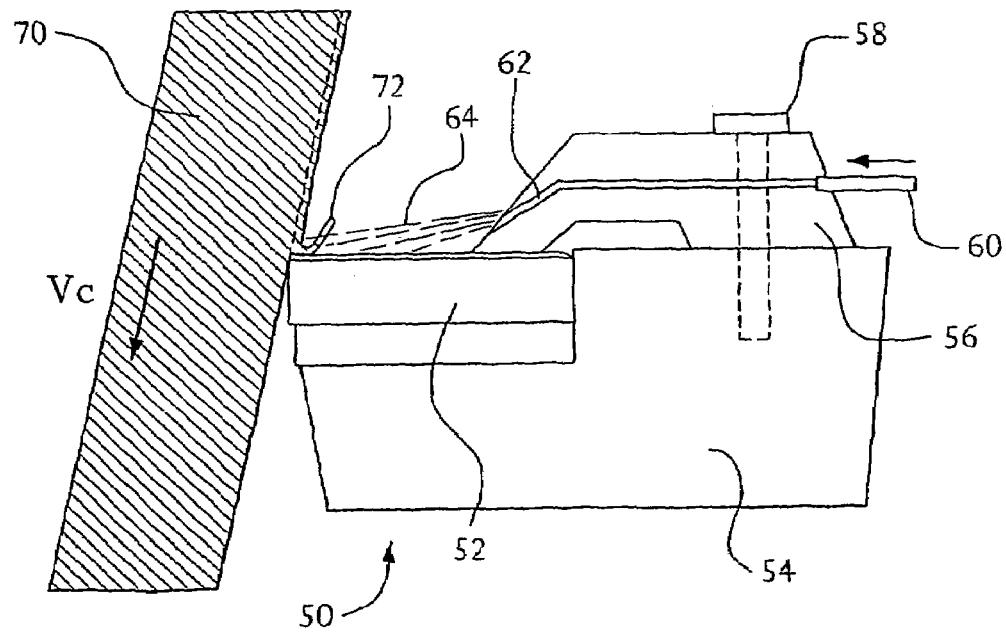

FIGS. 2A and 2B are schematic illustrations of two alternate embodiments of an apparatus 50 taught by the present invention. Referring to FIG. 2A, a clamp 16 is attached to a toolholder 54 by a bolt 58 or another fastening mechanism. An oxide-containing ceramic cutting insert 52 is supported by a carbide shim plate or other material. Cryogenic fluid passes through a delivery tube 60 and through a bore 62 which is drilled throughout the clamp to form a nozzle. A jet of cryogenic fluid 64 expands from the nozzle onto the cutting insert. In the most preferred mode of operation, the expanding jet terminates at the surface of the cutting insert. Alternatively, the jet may be allowed to expand further away to reach the chip 72 evolving from the workpiece 70 as well as the surface of the workpiece around the chip and the tool/workpiece contact zone. The workpiece moves across the cutting insert at a relative cutting speed $V_c$. The embodiments shown in FIGS. 2A and 2B differ in the configuration of the bore 62 drilled throughout the clamp to form a nozzle and in the location of the discharge point, as discussed below.

The embodiments shown in FIGS. 2A and 2B minimize the extent of modifications needed on a standard machining tool set-up to practice the present invention. The cryogenic fluid jetting nozzle is incorporated into a metal clamp 56 commonly used for holding the cutting inserts 52 in work position, which cutting inserts in this case are made of oxide-containing ceramics. The clamp may be bored to discharge the fluid as shown in FIG. 2A with the discharge point near the surface of the cutting insert. Alternatively, the bore 62 may project cryogenic fluid from a discharge point located above the surface of the cutting insert as shown in FIG. 2B. In both configurations, both the exit of the nozzle and the front part of the clamp are located away from the chip 72 evolving from the workpiece 70 during cutting, and are never in continuous contact with the chip and do not participate in the chip breaking operation.

To be fully effective, the cryogenic fluid 20 must be sufficiently cold (i.e., below about −150° C. or −238° F.) at the discharge point, which is the termination of the jetting nozzle in the preferred embodiment as shown in FIG. 1. The cryogenic fluid preferably is selected from the following: liquid nitrogen, a 2-phase mixture of liquid nitrogen and its vapor or a warmer nitrogen gas, a cryogenic vapor of liquid nitrogen, a warmer nitrogen gas chilled to below about −150° C., liquid argon, a 2-phase mixture of liquid argon and its vapor or a warmer argon gas, a cryogenic vapor of liquid argon, a warmer argon gas chilled to below about −150° C., or any combination of the above. However, persons skilled in the art will recognize that other cryogenic mixtures of liquids, gases, and solid particles could be used as the cryogenic fluid.

Preferably, the cryogenic fluid jet is turned on at least 10 to 20 seconds before the oxide-containing ceramic cutting tool begins cutting, i.e., contacting the workpiece and making chips. This "cooldown" is sufficient to pre-quench the most typical oxide-containing ceramic tools or inserts to cryogenic temperatures required to practice the invention. However, turning the cryogenic fluid on when the tool touches the workpiece or even a few seconds later also is acceptable. It is observed that the effect of the cryogenic fluid cooling is inversely proportional to the cumulative time during which the cutting tool is exposed to high temperature, i.e., the more complete is the cryo-cooling cycle, the more significant improvements in tool life are expected over a dry cutting condition. The cryogenic fluid flow can be turned off at the same moment at which the tool completes a cutting contact, i.e., making chips.

To be effective, the cryogenic fluid 20 jetted directly at the rake surface must impinge on the entire rake surface area or on at least 20% of the total rake surface area located on the side of the cutting edge. (Rake surface is the cutting tool surface adjacent the cutting edge which directs the flow of the chip away from the workpiece. In the embodiment shown in FIG. 1, rake surface is the top surface of the cutting insert 16. The rake surface may be completely flat, chamfered, or may have a more complex, three-dimensional topography produced by molding or an addition of a plate in order to provide an enhanced control chip flow and/or chip breaking.) Regardless of its topography, 20% of the rake surface area is the minimum impingement surface area assuring that the entire cutting tool, or cutting insert 16 made of oxide-containing ceramic material, becomes cryogenically cold and relatively uniform in temperature. With this approach to cryogenic impingement cooling, a tiny hot spot within the cutting tool material under the chip contact zone becomes smaller and engulfed by the cryogenically cold material. As a result, the entire cutting tool, or the cutting insert, becomes harder and stronger, and its thermal expansion-induced, internal stresses are reduced. The fact that the cutting insert becomes more resistant to fractures during cutting is an unexpected discovery or finding that could not be anticipated from the prior art.

In a preferred embodiment, the cryogenic fluid 20 is discharged directly at the rake surface of the cutting tool using an "external" nozzle located behind, above, or at the rake surface, but never closely to the cuffing edge in a direct and continuous contact with or adjacent to the chip evolving from this edge. The straight-line distance between the nozzle opening (discharge point) and the cutting edge is at least about 0.150 inches (3.8 mm) but not more than about 3.0 inches (76 mm). This range of discharge or jetting distances is important for proper operation because: (1) if the discharge distance was shorter, the cryogenic fluid jet expanding from the external nozzle would not be able to directly impinge on at least 20% of the total rake surface area on the side of the cutting edge; and (2) if the discharge distance was longer, the warm ambient air, entrained into the expanding cryogenic jet from the surroundings would raise the overall jet temperature to well above −150° C., thereby rendering the entire impingement cooling effect less effective.

The external nozzle can be made of tubing terminating behind, above, or at the rake surface. Alternatively, it can be made in the form of a channel drilled in the insert holding clamp 22 holding the cutting tool on the back end within the toolholder 12. It can be formed by any provision made and attached to the insert holding clamp or the toolholder which has a channel drilled for the discharge of the cryogenic fluid 20 from the desired distance at the rake surface and toward the cuffing edge. The nozzle exit can be round or flat vertically or horizontally, converging, straight or diverging. There are no particular limitations on the nozzle in the present invention, as long as the nozzle jets the cryogenic fluid at the rake surface from the desired distance in the desired direction while away from the chip. A multi-nozzle system may be beneficial in certain cutting operations, especially if the depth of cut and feed-rate are very low, e.g., 0.020 inches (0.51 mm) and 0.004 inches/revolution (0.1 mm/revolution) respectively. When the tool nose and/or cuffing edge are so marginally "immersed" in the workpiece material, it is sometimes helpful to provide cooling to the flank and/or clearance walls in addition to the rake surface.

The present invention is based on a possibly complete cryogenic cooling or freezing of the rake surface and the rest of a cutting tool made of oxide-containing ceramic materials known for their tendency to fail during cutting operations by brittle fracture. To accomplish this, enough cryogenic fluid must be jetted at the cutting tool to keep the cutting tool walls frosted during the entire cutting operation in spite of the fact that a significant amount of cutting heat enters the cutting tool through the hot chip contact area. If the frost line forms during cutting near the cutting edge and contact zone on the side walls and the rake surface which moves back toward the other end of the cutting tool, the cryogenic cooling effect is diminished, indicating the need for an increase in flowrate and/or pressure of the cryogenic fluid. Any tool cryo-cooling operation carried out without some white frost coating on the cutting tool or cutting insert surface would not obtain the full benefits achieved with the present invention. An exception would be if machining is carried out under very low humidity conditions, in a controlled atmosphere chamber or in a vacuum where the benefits could be achieved without producing a white frost coating. Under preferred conditions, no frost coating is expected to develop inside the direct impingement spot 18 of the cryogenic fluid 20, preferably a moisture-free product of nitrogen or argon. Thus, a part of the rake surface and/or sidewall surface may be free of frost because of continuous washing by a rapidly expanding and moisture-free cryogenic fluid.

Another important diagnostic method for carrying out cutting according to the present invention is to observe the dynamic effects at the cutting tool/workpiece interface—chip, tool nose, and workpiece surface just below the cutting edge. First, if the chip or work surface just below the cutting edge is bright red, or appears to melt, or burn, the flowrate and/or pressure of the cryogenic fluid 20 must be increased. Second, if the tool nose or the perimeter of the chip contact area on the rake surface is cherry-red, there is no need to increase the flowrate and/or pressure of the cryogenic fluid unless the frosted coating on the tool starts to shrink. Third, if the tool nose or the perimeter of the chip contact area on the rake surface is intensely bright red, the flowrate and/or pressure of the cryogenic fluid must be increased regardless of the condition of the frosted coating on tool surface. An occasional increase in the heat generation at the workpiece/cutting tool contact area may indicate geometric or compositional inhomogeneities of the work material, and could easily be quenched by increasing the flowrate of the cryogenic fluid to the point at which the whole contact zone, not just the tool surface is cooled in a direct impingement mode. A cutting tool cryo-cooling operation carried out according to the above guidelines will provide for improved results. Of course, other, more elaborate methods of diagnostics may include, but are not limited to, use of thermocouples, infrared sensors, temperature sensitive coatings, etc.

It was surprising and unexpected to Applicants that their cryogenic fluid cooling method resulted in an apparent strengthening and an enhanced machining performance of oxide-containing ceramic cutting tools, which normally tend to wear and fail by brittle cracking under dry machining conditions and catastrophically fracture on contact with conventional, room-temperature cutting fluids, or residues thereof. As shown in the examples below, the present invention results in productivity improvements of about 98% to about 182% and tool life improvement of about 250%. These improved results were surprising and unexpected to Applicants and would be surprising and unexpected to other persons skilled in the art.

While the exact reasons for the surprising and unexpected results which provide a substantial improvement over the prior art are not clear, it appears that these results may be due to a combination of factors. Without wishing to be bound by any particular theory, Applicants believe that these factors include but are not limited to: (1) cryogenic hardening of the entire cutting tool material, (2) reduction in thermal expansion-driven stresses within the entire cutting tool, and most unexpectedly, (3) reduction in thermal gradients at cutting tool surfaces due to a boundary film effect and/or the Leidenfrost phenomenon. The boundary film is a jetting condition-controlled, semi-stagnant, transient film which "softens" the cryogenic chilling effect and "smoothens" thermal profiles at the impingement-cooled surface. The Leidenfrost phenomenon occurs to a larger or smaller degree with all liquids sprayed at a target surfaces that is hotter than the boiling point of the liquid. Liquid droplets boil above the hot surface or the hot surface is screened by a layer of vapor. In the case of cryogenic liquids, especially if colder than minus 150° C., all cutting tool surfaces are hot, which means that a typical cryo-liquid jet slides on a boundary film of its vapor without directly wetting the tool. This makes the thermal profile of the cryojet-cooled cutting tool surface smoother. In the case of an oil or water-based cutting fluid, with its boiling point significantly higher than room temperature, boiling occurs only at a very close distance from the perimeter of chip contact zone at the cutting tool surface. When the chip changes direction during cutting, or the tool encounters a sudden cutting interruption, such a conventional fluid spreads over a suddenly exposed, hottest tool surface area where it boils explosively releasing vapor, microdroplets, and pressure waves. Applicants believe that the preferred method of their invention promotes formation of a thin boundary film and/or a Leidenfrost effect, which prevent(s) fracturing of oxide-containing ceramic cutting tools that catastrophically fracture on contact with conventional, room-temperature cutting fluids.

EXAMPLES

The following nomenclature is used in the examples below:

f: feed rate in units of inches per revolution or ipr (mm/rev)
doc: depth of cut in units of inches (mm)
U: cutting speed in units of feet per minute or SFM (m/min)
MRR: material removal rate in units of cubic inches per minute (cm$^3$/min)

Example 1

Roughing of Hardened, Forged Steel, 64 Rockwell Hardness on Scale C (64 HRc)

In this operation, a 0.5" (12.7 mm) round ceramic tool insert ($Al_2O_3$-TiC/black ceramic) was used for roughing a hardened, forged steel part and results were compared between dry and cryo-cooled processes. The machining parameters are as follows:
$f_{DRY}$=0.005 ipr (0.13 mm/rev) $f_{CRYO}$=0.007 ipr (0.18 mm/rev) doc=0.150 in.(3.8 mm)
$U_{DRY}$=348 SFM (106 m/min) $U_{CRYO}$=700 SFM (213 m/min)

Using cryo-cooling of the cutting tool, a significant increase in cutting speed was achieved, which in turn, contributed to increased material removal rate. The MRR for dry cutting was 3.1 in$^3$/min (50.8 cm$^3$/min), whereas for the cryo-cooled cutting, the MRR was 8.8 in$^3$/min. (144.2 cm$^3$/min), thereby resulting in a productivity improvement of about 182%. Many attempts were subsequently made to increase the cutting speed, feed rate, and MRR in the dry cutting operation in order to approach the performance level of the cryogenic fluid. All of these attempts resulted in rapid fractures and catastrophic failures of the ceramic insert.

It also was observed that, in spite of the increased cutting speed, feed rate, and MRR, the surface of the forged steel part machined with cryogenic fluid was exceptionally clean, unoxidized, and shiny, providing a significant improvement over the surface condition resulting from the conventional cutting method. It was further observed that the dimensional accuracy, e.g., tapering, of the forged steel part machined according to this cryogenic fluid method was improved.

Example 2

Finishing of Hardened, Forged Steel (64 HRC)

In this operation, a 0.5" (12.7 mm)round ceramic tool was used for finish turning the same part (example 1) and results were compared between dry and cryo-cooled processes. The machining parameters are as follows:
$f_{DRY}$=0.006 ipr (0.15 mm/rev) $F_{CRYO}$=0.010 ipr (0.25 mm/rev)
doc=0.070 in. (1.78 mm) $U_{DRY}$=434 SFM (132 m/min)
$U_{CRYO}$=693 SFM (211 m/min)

Using cryo-cooling of the cutting tool, a significant increase in cutting speed was achieved, which in turn, contributed to increased material removal rate. The MRR for dry cutting was 2.2 in$^3$/min. (36 cm$^3$/min), whereas for the cryo-cooled cutting, the MRR was 5.8 in$^3$/min. (95 cm$^3$/min), thereby resulting in a productivity improvement of about 166%.

Attempts were subsequently made to increase the cutting speed, feed rate, and MRR in the dry cutting operation in order to approach the performance level of the cryogenic fluid. All of these attempts resulted in rapid fractures and catastrophic failures of the ceramic insert.

It also was observed that, in spite of the increased cutting speed, feed rate, and MRR, the surface of the forged steel part machined with cryogenic fluid was exceptionally clean, unoxidized, and shiny, providing a significant improvement over the surface condition resulting from the conventional cutting method. It was further observed that the dimensional accuracy of the forged steel part machined according to this cryogenic fluid was improved.

Example 3

Roughing of Cast Steel (48–52 HRC)

In this operation, a LNU 6688 (ISO) ceramic tool insert was used for rough turning the main body of a cast steel part and results were compared between dry and cryo-cooled processes. The machining parameters for both dry and cryo-cooled processes are as follows:
f=0.011 ipr (0.28 mm) doc=0.330 in. (8.38 mm) U=424 SFM (129 m/min)

The tool life for dry cutting was 20 min., whereas the tool life for cryo-cooled cutting was 70 min., thereby resulting in a tool life improvement of 250%. It was also observed that the surface of the cast steel part machined with cryogenic fluid was exceptionally clean, unoxidized, and shiny, providing a significant improvement over the surface condition resulting from the conventional cutting method. It was further observed that the dimensional accuracy, e.g., tapering of the cast steel part machined according to this cryogenic fluid method was improved.

Example 4

Finishing of Forged Steel (48–52 HRC)

In this operation, a 1" (25.4 mm) round ceramic tool insert ($Al_2O_3$-TiC/black ceramic) was used for rough turning the main body of a forged steel part and results were compared between dry and cryo-cooled processes. The machining parameters are as follows:
f=0.020 ipr (0.51 mm/rev) doc=0.017 in. (0.43 mm)
$U_{DRY}$=259 SFM (79 m/min) $U_{CRYO}$=583 SFM (178 m/min)

Using cryo-cooling of the cutting tool, a significant increase in cutting speed was achieved, which in turn, contributed to increased material removal rate. The MRR for dry cutting was 1.1 in$^3$/min. (18 cm$^3$/min), whereas for the cryo-cooled cutting, the MRR was 2.4 in$^3$/min. (39 cm$^3$/min), thereby resulting in a productivity improvement of about 118%.

Many attempts were subsequently made to increase the cutting speed of MRR in the dry cutting operation in order to approach the performance level of the cryogenic fluid. All of these attempts resulted in rapid fractures and catastrophic failures of the ceramic insert.

It was observed that, in spite of the increased cutting speed and MRR, the surface of the forged steel part machined with cryogenic fluid was exceptionally clean, unoxidized, and shiny, providing a significant improvement over the surface condition resulting from the conventional cutting method. It was further observed that the dimensional accuracy of the forged steel part machined according to this cryogenic fluid method was improved.

Example 5

Roughing of 83CrMo135 Steel

In this operation, a LNU 6688 ceramic tool insert ($Al_2O_3$—$ZrO_2$/white ceramic) was used for roughing a 83CrMo135 steel part and results were compared between dry and cryo-cooled processes. The machining parameters are as follows:

f=0.0157 ipr (0.4 mm/rev) doc=0.060 in. (1.52 mm)
$U_{DRY}$=512 SFM (156 m/min) $U_{CRYO}$=1020 SFM (311 m/min)

Using cryo-cooling of the cutting tool, a significant increase in cutting speed was achieved, which in turn, contributed to increased material removal rate. The MRR for dry cutting was 5.8 $in^3$/min. (95 $cm^3$/min), whereas for the cryo-cooled cutting, the MRR was 11.5 $in^3$/min. (188 $cm^3$/min), thereby resulting in a productivity improvement of about 98%.

Attempts were subsequently undertaken to increase the cutting speed and MRR in the dry cutting operation in order to approach the performance level of the cryogenic fluid. All of these attempts resulted in rapid fractures and catastrophic failures of the ceramic insert.

It also was observed that, in spite of the increased cutting speed and MRR, the surface of the 83CrMi135 steel part machined with cryogenic fluid was exceptionally clean, unoxidized, and shiny, providing a significant improvement over the surface condition resulting from the conventional cutting method. The dimensional accuracy of the 83CrMi135 steel part machined according to this cryogenic fluid method was improved.

Example 6

Turning and Facing of a 9310 Carburized Steel Bearing Plate (60 HRC)

In this operation, two different oxide-containing ceramic tool inserts were used for turning and facing of a bearing plate and results were compared between dry and cryo-cooled processes. Varying feeds, speeds and depths of cut were used to finish the part. Using cryo-cooling of the cutting tool, a significant increase in cutting speed was achieved, which in turn, contributed to reduced cycle time for the part. The normal cycle time of 75 min. using dry cutting was reduced to 28 min. using cryo-cooled cutting, thereby resulting in a productivity improvement of about 168%.

Many attempts were subsequently made to shorten the cycle time using the conventional processes in order to approach the performance level of the cryogenic fluid. All of these attempts resulted in rapid fractures and catastrophic failures of the ceramic insert.

It also was observed that, in spite of a much faster cutting, the surface of the 9310 carburized steel bearing plate machined with cryogenic fluid was exceptionally clean, unoxidized, and shiny, providing a significant improvement over the surface condition resulting from the conventional cutting method. It was further observed that the dimensional accuracy of the plate machined according to this cryogenic fluid method was improved. Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. An apparatus for machining a workpiece, comprising:
an oxide-containing ceramic cutting tool adjacent the workpiece, all or substantially all of the oxide-containing ceramic cutting tool being made of an oxide-containing ceramic material or an other advanced material, said oxide-containing ceramic or other advanced material having at least about 5% by weight of an oxide ceramic phase throughout all or substantially all of the oxide-containing ceramic cutting tool; and
a means for cryogenically cooling the entire oxide-containing ceramic cutting tool,
whereby the entire oxide-containing ceramic cutting tool is cooled to a cryogenic temperature prior to and during machining of the workpiece with the oxide-containing ceramic cutting tool.

2. An apparatus as in claim 1, wherein the means for cryogenically cooling the entire oxide-containing ceramic cutting tool comprises a cryogenic fluid.

3. An apparatus as in claim 2, wherein at least a portion of the cryogenic fluid is delivered to the oxide-containing ceramic cutting tool in the form of a cryogenic jet.

4. An apparatus as in claim 3, wherein the oxide-containing ceramic cutting tool has a rake surface and at least a portion of the cryogenic jet impinges on at least a portion of the rake surface.

5. An apparatus as in claim 2, wherein at least a portion of the cryogenic fluid is a two-phase fluid.

6. An apparatus as in claim 2, wherein the cryogenic fluid is selected from a group consisting of liquid nitrogen, gaseous nitrogen, liquid argon, gaseous argon and mixtures thereof.

7. An apparatus as in claim 3, wherein at least a portion of the cryogenic jet has a temperature below about minus 150 degrees Celsius (−150° C.).

8. An apparatus as in claim 2, wherein the oxide-containing ceramic cutting tool has a cutting edge and the means for cryogenically cooling the entire oxide-containing ceramic cutting tool further comprises a means for delivering at least a portion of the cryogenic fluid to the oxide-containing ceramic cutting tool, said means for delivering having at least one discharge point spaced apart from the cutting edge by a distance greater than or equal to about 0.150 inches and less than about 3.0 inches.

9. An apparatus as in claim 1, wherein at least a portion of the oxide-containing ceramic cutting tool is frosted when the workpiece contacts the oxide-containing ceramic cutting tool.

10. A method for machining a workpiece, comprising the steps of:

providing an oxide-containing ceramic cutting tool adjacent the workpiece, all or substantially all of the oxide-containing ceramic cutting tool being made of an oxide-containing ceramic material or an other advanced material, said oxide-containing ceramic or other advanced material having at least about 5% weight of an oxide ceramic phase throughout all or substantially all of the oxide-containing ceramic cutting tool; and cryogenically cooling the entire oxide-containing ceramic cutting tool, whereby the entire oxide-containing ceramic cutting tool is cooled to a cryogenic temperature prior to and during machining of the workpiece with the oxide-containing ceramic cutting tool.

11. A method as in claim 10, wherein the entire oxide-containing ceramic cutting tool is cryogenically cooled by a cryogenic fluid.

12. A method as in claim 11, wherein at least a portion of the cryogenic fluid is delivered to the oxide-containing ceramic cutting tool in the form of a cryogenic jet.

13. A method as in claim 12 wherein the oxide-containing ceramic cutting tool has a rake surface and at least a portion of the cryogenic jet impinges on at least a portion of the rake surface.

14. A method as in claim 11, wherein at least a portion of the cryogenic fluid delivered to the cutting tool is a two-phase fluid.

15. A method as in claim 11, wherein the cryogenic fluid is selected from a group consisting of liquid nitrogen, gaseous nitrogen, liquid argon, gaseous argon and mixtures thereof.

16. A method as in claim 12, wherein at least a portion of the cryogenic jet has a temperature below about minus 150 degrees Celsius (−150° C.).

17. A method as in claim 11, wherein the oxide-containing ceramic cutting tool has a cutting edge and wherein a means for delivering a portion of the cryogenic fluid to the oxide-containing ceramic cutting tool has at least one discharge point spaced apart from the cutting edge by a distance greater than or equal to about 0.150 inches and less than about 3.0 inches.

18. A method as in claim 10, wherein at least a portion of the oxide-containing ceramic cutting tool is frosted when the workpiece contacts the oxide-containing ceramic cutting tool.

* * * * *

UNITED STATES PATENT AND TRADEMARK OFFICE
CERTIFICATE OF CORRECTION

PATENT NO. : 7,252,024 B2  
APPLICATION NO. : 10/478939  
DATED : August 7, 2007  
INVENTOR(S) : Zbigniew Zurecki et al.

It is certified that error appears in the above-identified patent and that said Letters Patent is hereby corrected as shown below:

Column 14, Line 59  
In claim 8, delete the word "cuffing" and insert the word -- cutting --

Column 14, Line 64  
In claim 9, delete the word "cuffing" and insert the word -- cutting --

Column 15, Line 8  
In claim 10, delete the word "cuffing" and insert the word -- cutting --

Column 15, Line 12  
In claim 10, delete the word "cuffing" and insert the word -- cutting --

Column 15, Line 15  
In claim 10, delete the word "cuffing" and insert the word -- cutting --

Column 15, Line 21  
In claim 12, delete the word "cuffing" and insert the word -- cutting --

Column 16, Line 13  
In claim 17, delete the word "cuffing" and insert the word -- cutting --

Column 16, Line 15  
In claim 17, delete the word "cuffing" and insert the word -- cutting --

Column 16, Line 18  
In claim 17, delete the word "cuffing" and insert the word -- cutting --

Signed and Sealed this

Twenty-third Day of October, 2007

JON W. DUDAS  
*Director of the United States Patent and Trademark Office*